Feb. 19, 1929.
R. E. MANLEY
1,702,738
TREATING ADSORBENT MATERIALS
Filed Jan. 26, 1924
Fig. 1,
Fig. 2,
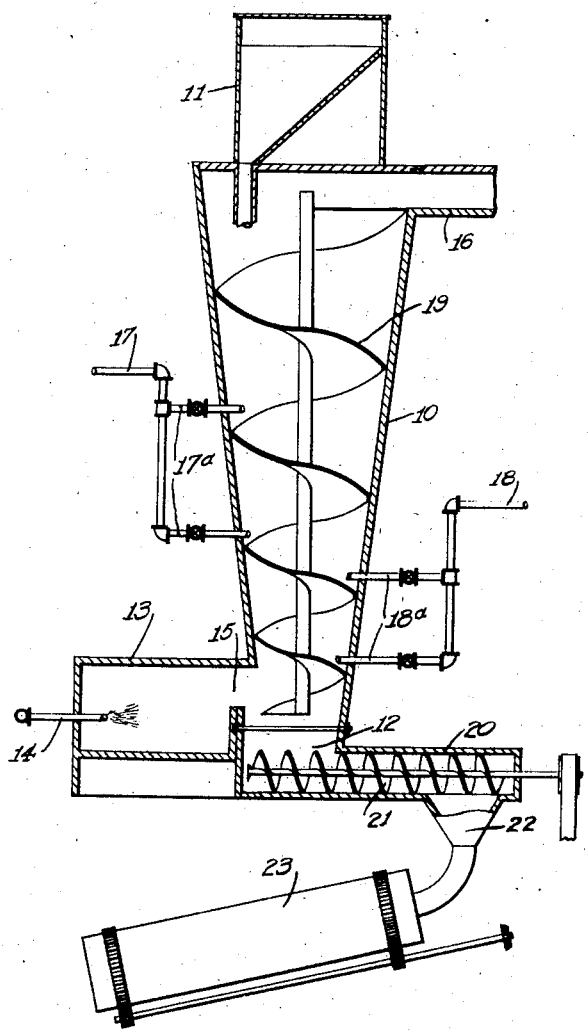
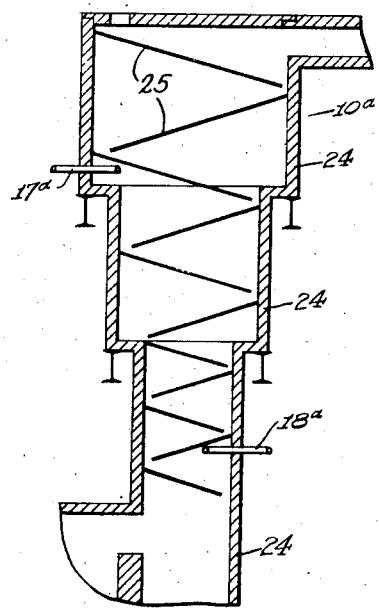
Robert E. Manley, Inventor
By his Attorney Patented Feb. 19, 1929.

1,702,738

UNITED STATES PATENT OFFICE.

ROBERT E. MANLEY, OF PORT ARTHUR, TEXAS, ASSIGNOR, BY MESNE ASSIGNMENTS, TO THE TEXAS COMPANY, OF NEW YORK, N. Y., A CORPORATION OF DELAWARE.

TREATING ADSORBENT MATERIALS.

Application filed January 26, 1924. Serial No. 688,639.

This invention relates to the treatment of granular or pulverulent material. The invention has special reference to the removal of distillable or vaporizable constituents from absorbent or adsorbent materials and has a particular field of usefulness in the revivification or regeneration of filtering or decolorizing substances. More particularly the invention contemplates the revivifying of fuller's earth or other filtering or purifying media employed in the treating or decolorizing of oil.

The invention contemplates a method of and apparatus for subjecting pulverulent or granular material to a distillation treatment with a suitable carrier gas and a final heat treatment under oxidizing conditions. As stated, the invention has particular application in the treatment of materials employed in filtering, decolorizing or purifying oils. The filtering or adsorbent medium employed in time loses its decolorizing or purifying qualities and it is desirable to revivify this material in order that it may be reused. Thus in the case of treating hydrocarbon oils the pores or cells of the filtering or adsorptive media become impregnated with a bituminous or asphaltic material. In the practice of the invention the spent material, containing the occluded bituminous or asphaltic matter, is subjected to a distilling treatment with a suitable carrier gas, such as steam, whereby the bituminous and asphaltic matter is distilled and removed even from the more central cells of the adsorptive media. The material is then subjected to a final treatment under oxidizing conditions in order to completely remove the occluded bituminous or carbonaceous matter and thus restore the decolorizing or purifying properties of the material.

The invention contemplates a process and apparatus in which the material to be treated is caused to travel downwardly through a heated chamber wherein it is subjected during the first portion of its travel to a distilling action with a carrier gas and during the latter portion of its travel to heating under oxidizing conditions. In accordance with the invention a retort or treating chamber, preferably of the vertical type, is equipped with a baffle arrangement, preferably a spiral or helical baffle, which conducts the material through the retort and which also serves to obstruct the passage through the retort of a suitable heating medium. At a predetermined point in the retort steam or other suitable carrier gas is introduced and at a lower point in the retort air or oxygen or other suitable oxygen-bearing gas is admitted so as to maintain oxidizing conditions.

A special feature of the invention consists in passing the material to be treated downwardly in contact with a gaseous medium flowing upwardly at a progressively decreasing velocity. The reduction in velocity of the heating medium passing through the chamber serves to reduce to a minimum the loss of granular or pulverulent material through the stack or flue.

The invention embraces certain other novel methods of operation and certain novel forms of construction which will be more clearly set forth hereinafter.

The invention is illustrated in the accompanying drawings wherein:

Figure 1 is a sectional elevation of an apparatus constructed in accordance with the invention and constituting an embodiment thereof.

Figure 2 is a partial sectional view of a modified type of apparatus.

Referring now particularly to Figure 1 it will be seen that there is provided a retort or treating vessel 10 which, as illustrated, is vertically disposed. It will be understood that if desired the chamber may be inclined but it should be so arranged as to facilitate the passage of the material being treated from one end to the other of the chamber. As illustrated, the retort is equipped at the top with a hopper 11 for introducing the adsorbent material and with an outlet opening 12 at the bottom through which the treated material is discharged.

The heat required may be supplied to the retort in any suitable manner. It is preferred, however, to introduce a heated gaseous medium at the lower end of the retort and cause the heating medium to pass upwardly through the chamber in such a manner that the heat required may be imparted to the solid material during its passage down through the chamber. Thus a furnace 13, supplied with an oil or gas burner 14 or other suitable heating means, may be employed. A passage 15 serves to conduct the products of combustion to the lower end of the retort 10. In operation it is generally preferable to carry on combustion in the furnace in such a manner that no flame will be discharged into the retort 10. In the revivification of many adsorbent materials, such for example as fuller's earth, care must be taken not to heat the material to such an excessive temperature as to cause fusion and destruction of the cellular structure of the clay. The heating medium is discharged from the upper end of the retort by means of a suitable pipe or conduit 16 which may extend to a suitable dust separator and to a condenser for liquefying or trapping out condensable constituents.

Means is provided for admitting steam or other suitable carrier gas to the retort at a predetermined point or points. Thus the pipe 17 may extend from a suitable source of steam or other carrier agent and terminate within the retort at the particular point desired, which is preferably in the upper or intermediate portion of the retort. The pipe is preferably equipped with a plurality of valved branch lines 17$^a$ so disposed as to introduce the carrier agent at various points desired. At a point below the point of entrance of the steam pipes there is provided means for introducing to the retort air or oxygen. Thus the pipe 18, which may be equipped with one or more valved branch lines 18$^a$, is provided for admitting the air or oxygen.

The retort 10 is provided with a suitable baffle or baffles which serve to so obstruct the passage of the pulverulent material as to keep the same in contact with the heated gases in the retort for a time sufficient to enable the material to be heated to the degree desired. Thus a helical baffle 19 may be provided upon which the material may travel through the heated chamber 10. The spiral baffle also serves to obstruct the passage of the heating medium through the retort and operates to impart a whirling or gyratory motion to the upwardly passing gases. It is preferable to so arrange the pipes or discharge nozzles 17$^a$ and 18$^a$ as to discharge fluid tangent to the spiral baffle 19.

In order to reduce to a minimum the carrying away of pulverulent material by the effluent gases I provide a retort of progressively decreasing cross section from the point of exit to the point of entrance of the heated gaseous medium. Thus it will be observed that in the type of apparatus shown in Figure 1 the walls of the retort 10 taper inwardly from top to bottom so that the cross section of the retort at the bottom at the point of entrance of the heated gases is comparatively narrow with the result that the velocity of gases passing through the lower portion of the retort is comparatively high. As the cross sectional area increases upwardly there is a consequent reduction in velocity of the gases. It will also be observed that the gyratory motion of the gases passing through the chamber produces a centrifugal action which results in a certain selective action wherein the heavier particles are thrown against the retort wall thus insuring that these heavier particles will descend to the bottom of the retort. Thus if any material at all be carried away by the effluent gases it will in the main consist only of the very lightest material which may readily be collected in a suitable dust collector.

The outlet passage 12 preferably communicates with a conduit 20 which may be provided with a screw conveyer 21 which serves to remove the treated material from the retort. The conduit 20 may discharge into a hopper 22 which may communicate with a rotary cooler 23.

In the modified form of the invention illustrated in Figure 2 a retort 10$^a$ is shown as composed of a plurality of sections 24 of progressively decreasing cross sectional area from top to bottom. The velocity of travel of the heated gases through the retort is thus reduced. The retort is equipped with a plurality of baffles 25 upon which the adsorbent material travels downwardly through the retort and which also serve to obstruct the passage of the heated gases. One or more of the chambers is provided with a pipe or pipes 17$^a$ for introducing the steam or other carrier gas and one or more of the sections is provided with a pipe or pipes 18$^a$ for admitting air or oxygen.

For the purpose of describing the practice of the invention as applied in treating adsorbent material reference will now be had to a specific application of the invention wherein the apparatus shown in Figure 1 is applied for the revivification of spent fuller's earth or other adsorptive media employed in decolorizing hydrocarbon oils. The material is admitted through the hopper 11 to the upper part of the retort 10 and is discharged upon the spiral baffle 19. The material in descending through the retort is met with a current of heated gas which enters through the passage 15 and is discharged from the retort through the outlet passage 16. Steam, which may if desired be superheated, is admitted to the retort through one or more of the pipes 17$^a$. The combined action of the heated gases and the steam produces a distillation whereby bituminous, or other vaporizable constituents, occluded in the pores or cells of the earth, are distilled therefrom. The vaporized constituents pass out through the outlet 16 and may, if desired, be condensed and collected. As the clay descends through the heating chamber 10 the action of the carrier gas serves to remove the occluded bituminous or asphaltic matters from the clay, or at least to bring these materials from the more central pores to the surface. As the descending material encounters a higher temperature in the presence of air or oxygen admitted through one or more of the pipes 18ª the material held in the surface pores is readily oxidized and thus the pores are freed of occluded matter and the clay is regenerated. The treated material passes to the bottom of the retort and is continuously removed by the screw conveyer 21 and thus discharged into the rotary cooler 23.

My invention is adapted for treating all kinds of materials containing adsorbed constituents which may be distilled or removed by heat. It is adapted for treating adsorbent materials whether of a relatively coarse, granular nature or of a more finely pulverized character. It is particularly adapted, however, for the revivification of spent adsorbent material of a finely divided nature, such for example, as fine mesh fuller's earth.

Obviously many modifications and variations of the invention, as hereinbefore set forth, may be made without departing from the spirit and scope thereof, and therefore, only such limitations should be imposed as are indicated in the appended claims.

What I claim is:

1. The process of treating adsorbent material which comprises passing the material downwardly in a helical course of travel through a heated passage, bringing steam into contact with the material during the first portion of its travel and maintaining oxidizing conditions in the latter portion of its travel.

2. The process of treating adsorbent material which comprises passing the material downwardly in contact with a gaseous medium flowing upwardly at a progressively decreasing velocity.

3. The process of treating adsorbent material which comprises passing said material downwardly in a helical course counter current to a gyratory flow of heated gases.

4. Apparatus for treating adsorbent material comprising a substantially vertical chamber of progressively decreasing cross section from top to bottom, means for introducing the adsorbent material to the upper portion of the chamber, means for removing material from the lower portion of the chamber, means for introducing a hot gas to the lower portion of the chamber, means for introducing steam into the chamber, and means for introducing air into the chamber positioned at a point below said steam introducing means.

5. Apparatus for treating adsorbent material comprising a substantially vertical chamber of progressively decreasing cross section from top to bottom, means for introducing the adsorbent material to the upper portion of the chamber, means for introducing a hot gas at the lower portion of the chamber, means for retarding the upward passage of said gas through the chamber which means is also adapted to guide the adsorbent material downwardly through the chamber, means for discharging the material from the lower portion of the chamber, means for introducing steam at a point in said chamber and means for introducing air at a lower point in said chamber.

6. Apparatus for treating adsorbent material comprising a substantially vertical chamber, means for introducing the adsorbent material to the upper portion of said chamber, a helical baffle extending through the chamber adapted to serve as a guide for the adsorbent material, means for introducing a heated gas to the lower portion of said chamber, means for introducing air to said chamber and means for introducing steam at a point above the air-introducing means.

7. Apparatus for treating adsorbent material comprising a substantially vertical chamber of progressively decreasing cross section from top to bottom, means for introducing the adsorbent material at the top of said chamber, a helical baffle extending through said chamber, means for introducing a heating medium to said chamber, means for introducing steam at an intermediate point in said chamber and means for introducing air at a lower point.

8. Apparatus for treating adsorbent material comprising a substantially vertical chamber, means for introducing adsorbent material to the upper part of said chamber, a helical baffle extending through said chamber, means for introducing a heating medium to said chamber, means for introducing steam at an intermediate point in said chamber and means for introducing air at a lower point, said means for introducing air and steam being arranged and adapted to discharge fluid in streams approximately tangent to the helical baffle.

9. Apparatus for treating adsorbent material comprising a substantially vertical chamber consisting of a plurality of sections of progressively decreasing cross section from top to bottom, means for introducing the adsorbent material to the upper part of said chamber, means for introducing a heated medium to the lower portion of the chamber, baffles in said chamber, means for introducing steam at an intermediate point in the chamber and means for introducing air at a lower point.

10. Apparatus for treating adsorbent material comprising a chamber, inlet and outlet means for a heating medium for said chamber, a helical guide intermediate said inlet and outlet means, and means for admitting material to be treated to said helical guide.

11. Apparatus for treating adsorbent material comprising a chamber provided with inlet and outlet means for a heating medium and formed with a progressively increasing cross sectional area from the inlet to the outlet means.

12. Apparatus for treating adsorbent material comprising a chamber provided with inlet and outlet means for a heating medium, said chamber being formed of progressively increasing cross sectional area from the inlet to the outlet means and provided with a spiral guide intermediate said inlet and outlet means and adapted to guide material through the chamber.

In witness whereof I have hereunto set my hand this 5th day of January, 1924.

ROBERT E. MANLEY.